United States Patent [19]
Yoneta et al.

[11] Patent Number: 5,663,276
[45] Date of Patent: Sep. 2, 1997

[54] WHOLLY AROMATIC POLYESTER, COMPOSITION THEREOF, AND MOLDED ARTICLE MADE THEREFROM

[75] Inventors: Hiroyoshi Yoneta; Satoshi Murouchi, both of Yokohama; Hideo Watanabe, Meguro-ku, all of Japan

[73] Assignee: Nippon Petrochemicals Company, Limited, Tokyo, Japan

[21] Appl. No.: 387,755

[22] PCT Filed: Jun. 15, 1994

[86] PCT No.: PCT/JP94/00965

§ 371 Date: Feb. 15, 1995

§ 102(e) Date: Feb. 15, 1995

[87] PCT Pub. No.: WO94/29365

PCT Pub. Date: Dec. 22, 1994

[30] Foreign Application Priority Data

Jun. 15, 1993 [JP] Japan .................................. 5-168654
Jun. 15, 1993 [JP] Japan .................................. 5-168655
Jun. 15, 1993 [JP] Japan .................................. 5-168656

[51] Int. Cl.$^6$ ............................................. C08G 64/00
[52] U.S. Cl. ..................... 528/194; 427/58; 427/384; 427/385.5; 428/421; 428/480; 524/601; 524/789; 528/176; 528/190; 528/193
[58] Field of Search ........................ 428/421, 480; 427/58, 384, 385.5; 528/176, 190, 193, 194; 524/601, 789

[56] References Cited

U.S. PATENT DOCUMENTS

5,071,942 12/1991 Brewbaker et al. .................. 528/193

Primary Examiner—Terressa Mosley
Attorney, Agent, or Firm—Scully, Scott, Murphy & Presser

[57] ABSTRACT

A wholly aromatic polyester having excellent moldability, heat resistance and blistering resistance and a composition thereof are obtained from an aromatic polyester composed of six specified types of structural unit and having an optical melt anisotropy. The composition can provide electronic heater parts and oven-ware both excellent in mechanical strength, heat resistance, moldability and microwave oven resistance, and various other heat-resistant members. Molded articles made from this composition can be coated with fluorocarbon resin without the necessity for pretreatment such as heat treatment.

11 Claims, 2 Drawing Sheets

Fig. 1

Fig. 2

WHOLLY AROMATIC POLYESTER, COMPOSITION THEREOF, AND MOLDED ARTICLE MADE THEREFROM

TECHNICAL FIELD

The present invention relates to an organic material of a novel wholly aromatic polyester which has a high elastic coefficient, fluidity and heat resistance. More particularly, the invention relates to an organic material as a polymer having a specific composition and it has a high elastic coefficient which is realize by orienting the chains of molecules in the direction of the flow of material in a fluidized condition.

Furthermore, the present invention relates to component parts of electronic heating devices and oven ware which are made from the wholly aromatic polyester and are excellent in mechanical strength, heat resistance, moldability, workability and anti-electronic oven-range characteristics.

The term electronic heating devices herein referred to includes, as described later, electronic ovens, electronic ranges and electronic oven-ranges.

The present invention further relates to articles which are made of a heat resistant wholly aromatic polyester and are coated with fluorocarbon resin such as polyfluoroethylene.

BACKGROUND ART

Some plastic materials such as polymethylterpene and polysulfone are used for making cooking ware which is used in microwave ovens or electronic oven-ranges and component parts of electronic oven-ranges.

The methods of heating in the electronic oven-ranges are exemplified by range heating with the irradiation of microwaves and oven heating with hot air blasting and grill heating with infrared lamps. The cooking ware used in electronic oven-ranges and several component parts of electronic oven-ranges are required to have various properties such as excellent heat resistance, chemical resistance and desirable external appearance. Especially, concerning the heat resistance, very severe characteristic property is required because the parts or cooking ware are exposed not only to the high-frequency heat but also to the heat of oven heating or grill heating. For example, the temperature in an electronic oven-ranges is generally about 260° C. and, in the case of oven heating, the temperature becomes partially about 300° C. and, in the case of grill heating, the temperature sometimes becomes above 300° C. Accordingly, the articles used for this purpose must not be deformed and must have sufficient mechanical strength in practical uses.

The wholly aromatic polyester has excellent properties due to its structure. Especially, in view of the heat resistance, it is the best one among all sorts of resins. The wholly aromatic polyesters which are prepared from terephthalic acid, isophthalic acid, p-hydroxy benzoic acid or its derivatives, and biphenyl-4,4-diol (4,4-diphenol) or its derivatives are widely used for electric and electronic fields such as ovens and ranges because they can be shaped by injection molding, their mechanical and electrical properties are excellent and they can meet other various requirements in the use of plastic articles such as good heat resistance, chemical resistance, oil resistance, radiation resistance, and dimensional stability (e.g. Patent Publication No. Hei 4-20327).

The above-mentioned wholly aromatic polyesters are acceptable in the heat resistance as represented by heat distortion temperature. It is, however, pointed out as a defect that, when injection molded articles are put in an atmosphere of 300° C. or above, oven-blistering (blistering caused by heat) is liable to occur in the surfaces of molded articles. When oven-blistering occurs in the surface of molded articles, the external appearance of them are spoiled resulting in the loss of their commercial value. The cause of this blistering is not always clear. Even in the case of highly heat resistant wholly aromatic polyester resin having a heat distortion temperature of above 350° C., the blistering often occurs at temperatures below 300° C. In other words, in the electronic oven-ranges having functions of oven heating and grill heating, when the wholly aromatic polyester is used as their constituent parts or as cooking ware, they are difficultly used because of the occurrence of blistering due to their inferior characteristics for the use in electronic oven-ranges.

In order to improve the oven-range resistance (to avoid blistering), oven-range parts or oven ware of molded articles are previously subjected to heat treatment at a temperature below the blistering temperature. However, this method is not practical because the production cost is increased with lowering the yield rate.

In recent years, it is proposed to apply the coating of fluorocarbon resin to surfaces of wholly aromatic polyester articles in order to impart non-stickiness and low frictional property molded articles of wholly aromatic polyester (e.g., Patent Publication No. Hei 4-20327). The fluorocarbon resins used for the coating, polyfluoroethylenes are most suitable in view of heat resistance. Among them, polytetrafluoroethylene is most desirable.

As a method for applying the polyfluoroethylene to the surface of molded articles, it is generally done that the dispersion or enamel of polyfluoroethylene is applied to the surfaces of articles by spraying, brush coating or else and the coated articles are heated to a temperature above the melting point of the polyfluoroethylene, which is flowed by baking.

The wholly aromatic polyesters are good in the heat resistance which is represented by the heat distortion temperature thereof. However, it is pointed out as a defect that, when injection molded articles are put in an atmosphere of 300° C. or above, oven-blistering is liable to occur in the surfaces of molded articles. For this reason, when the wholly aromatic polyester articles are coated with polyfluoroethylene as described above, there are problems that blistering is often caused to occur in the process of heating the molded articles to temperatures of 300° C. to 340° C. or above and the frequency of blistering is increased resulting in the lowering of yield rate of products.

As the methods for avoiding the problem of this kind, it is considered to lower heat treatment temperature or to use fluorine-containing resin having a low boiling point as a coating resin material. However, the peeling off or rupturing of coating film in the use is liable to occur in the former case, while the use of molded articles at high temperatures is limited due to the low heat resistance of the coating in the latter case.

In another method for settling the above problem in order to improve the blistering resistance, the heat treatment of molded articles is done prior to the coating process. In this case, it is most effective that the heat treatment is carried out at a temperature below the melting point, for example, at a temperature which is lower than the melting point by 80° C. It is proposed that a coating of polytetrafluoroethylene is formed on the surface of a plate. However, the introduction of such heat treatment process causes the serious rise of production cost and the lowering of productivity in the production site, which are not desirable.

In the case of a copolyester which is made by copolymerizing hydroxycarboxylic acid such as hydroxybenzoic acid, the sequences of structural units derived from the hydroxycarboxylic acid may become different with preparation conditions. In other words, with preparation conditions, the structural units derived from hydroxycarboxylic acid are introduced into the copolyester in a block form or in a random manner. It is easily supposed that the properties of obtained copolyesters are varied in accordance with the variation of structures. In the present status of art, however, it has not yet been clarified sufficiently what kind of sequence of copolyester has influence on properties such as fluidity, workability, heat resistance and blistering resistance. Besides the sequencing property of hydroxycarboxylic acid, in copolyesters of a plurality of both acids and diols, there is a possibility that the structural factor such as the arrangement of these acids and diols has influence on the physical properties of the copolyester. However, the influences of structural factor like this on physical properties have never been revealed sufficiently.

As described above, although the wholly aromatic polyester is excellent in heat resistance, the difficulty in moldability has hitherto been pointed out. Furthermore, although the heat distortion temperature thereof is high, it has been pointed out that the oven blistering is liable to occur in the molded articles e.g. injection molded articles.

In the conventional method to improve moldability, the melting point is made low by lowering the linearity or rigidity of polymer by means of the copolymerization of non-linear monomers such as isophthalic acid and 6-hydroxy-2-naphthoic acid; the copolymerization of monomers having soft chains such as ethylene glycol; and the copolymerization of monomers having bulky substituent groups such as chlorohydroquinone and phenylhydroquinone.

In these methods, however, because the improvement in moldability is attained only by the lowering of melting point, the heat resistance, especially the heat distortion temperature is largely lowered in comparison with the lowering of melting point. Therefore, it is quite difficult to balance the moldability with heat resistance.

Accordingly, it has been demanded to provide a wholly aromatic polyester which is good in fluidity and is balanced in moldability, heat resistance and blistering resistance.

The object of the present invention is to provide machine parts of electronic heating devices and oven ware which are excellent in mechanical strength, heat resistance, moldability and electronic oven-range resistance.

Another object of the present invention is to provide a fluororesin coating material using wholly aromatic polyester which can be used for applying polyfluoroethylene coating to the surfaces of molded articles without the necessity of pretreatment such as heat treatment.

DISCLOSURE OF INVENTION

The present inventors have carried out extensive study by synthesizing several kinds of polyesters having optical melt anisotropy in order to improve the moldability and heat resistance of structural material. As a result, the present invention has been accomplished.

The first point in the present invention relates to an aromatic polyester having optical melt anisotropy, which is characterized in that the polyester comprises the structural units represented by the following formulae (1) to (6):

(wherein each of k, l, m, n, o, and p indicates the content (mole %) of each constituent unit in the polyester, and they have relationship of $20 \leq k \leq 80$, l+m equals to n+o+p, $0 \leq o \leq 10$, $1 \leq p \leq 7$, and $0 \leq m \leq (l+m)/2$)

The second point of the present invention to a polyester resin composition which is made by adding 95 wt. %, based on the weight of the composition or less of an inorganic filler to the above aromatic polyester having optical melt anisotropy.

The third point of the present invention relates to an aromatic polyester which comprises the structural units as defined in the above first point of the present invention and which meets the following equation:

$$Tv - Tm < +10° C.$$

wherein Tm is a melting point (° C.) which is determined by differential scanning calorimeter (DSC) and Tv is the temperature at which apparent viscosity is abruptly reduced as a function change of temperature and which is measured using a capillary rheometer (stabilization starting temperature of apparent viscosity, ° C.).

The fourth point of the present invention relates to inner parts for electronic heaters and oven ware which are made of the aromatic polyester having optical melt anisotropy of the foregoing first point of the invention.

The fifth point of the present invention relates to molded articles which are made of the aromatic polyester having optical melt anisotropy of the foregoing first point of the present invention and which is applied with the coating of fluorocarbon resin.

The present invention will be described in more detail.

In connection with the polyesters according to the present invention, the constituent unit represented by the formula (1) is derived from p-hydroxybenzoic acid (HBA), the constituent unit represented by the formula (2) is derived from 4,4'-biphenol (BP), the constituent unit represented by the formula (3) is derived from hydroquinone (HQ), the constituent unit represented by the formula (4) is derived from terephthalic acid (TPA), the constituent unit represented by the formula (5) is derived from isophthalic acid (IPA), and the constituent unit represented by the formula (6) is derived from 4,4'-biphenyldicarboxylic acid (BP-DC).

The symbols k, l, m, n, o, and p indicate the content (mole %) of the respective constituent units of the equations (1) to (6) in the polyester. They meet the following relationship.

I) $20 \leq k \leq 80$,
II) $l+m$ substantially equals to $n+o+p$,
III) $0 \leq o \leq 10$,
IV) $1 \leq p \leq 7$, preferably $1 \leq p < 4$, and
V) $0 \leq m \leq (1+m)/2$, preferably $0.5 \leq m \leq (1+m)/2$.

The constituent unit of equation (1) is an inevitable component. When the content k exceeds 80 mole %, it is not desirable because the crystalline melting point of the obtained polyester is higher than its thermal decomposition temperature and the molding is impossible. On the other hand, when the value k is lower than 20 mole %, it is not desirable because the crystal formation of polyester chains is difficult and the elastic modulus of molded articles is low and the heat resistance thereof is not high enough.

The constituent unit of equation (6) is also inevitable in the present invention. By applying this, the effect to improve the fluidity of polyester can be produced. Nevertheless, this effect can be produced by copolymerizing a small quantity of the material.

If the content p of the constituent unit of equation (6) is more than 7 mole %, the preparation of polyester by the ordinary melt polycondensation method is difficult and a longer polymerization time is necessary in order to obtain a polymer of sufficient polymerization degree, as compared with the case in which the constituent unit of formula (6) is not added. For this reason, the coloring of obtained polymer is conspicuous which is not desirable in the industrial production. In addition, it is not desirable that the economical advantage in the polymer production is lost with the increase of polymerization time. If the content is less than 1 mole %, it is not desirable because the above-described effect of copolymerization in the constituent unit of equation (6) to improve the fluidity of polyester cannot be produced. The more preferable content of p is $1 \leq p < 4$.

The constituent unit of equation (5) is desirable for improving the moldability of obtained polyester. If the content of o exceeds 10 mole %, it is not desirable because the heat distortion temperature is lowered markedly.

Furthermore, constituent unit of equation (3) is desirable to improve the heat resistance. The content m is smaller than 1. If it is larger than 1, it is not desirable because the moldability is lowered. The value is more preferably $0.5 \leq m \leq (1+m)/2$.

Furthermore, the value of $l+m$ substantially equals to $n+o+p$. In other words, the sum of the contents (mole %) of the constituent unit of equation (2) and that of equation (3) is substantially the same as the sum (mole %) of the constituent units of equations (4), (5) and (6).

Furthermore, the aromatic polyester of the present invention meets the following equation.

$$Tv-Tm < +10° C.$$

In this equation, Tm is a melting point (° C.) which is measured with a differential scanning calorimeter (DSC) and Tv is a temperature at which the change in apparent viscosity is abruptly reduced in the rise of temperature. The value is the stabilization starting temperature (° C.) of apparent viscosity that is measured using a capillary rheometer.

The aromatic polyester in which the difference of Tv and Tm, (Tv–Tm), is smaller than +10° C. has a high value in heat resistance and especially, the blistering resistance is high. This value may sometimes be minus. However, it is desirable that this value is not lower than −80° C. and preferably not lower than −50° C. Meanwhile, if the difference of Tv and Tm, (Tv–Tm), is larger than +10° C., it is not desirable because the heat resistance and the blistering resistance of the aromatic polyester are low. The method of practical measurement of Tv and Tm will be described later.

The aromatic polyester of the present invention can be produced in accordance with the conventional polycondensation method of polyester and it is not limited. The following methods (1) to (4) are exemplified as typical ones.

(1) A method to prepare by deacetic acid polycondensation of a diacylate of aromatic dihydroxy compound or an acylate of aromatic hydroxycarboxylic acid with an aromatic dicarboxylic acid such as terephthalic acid or 4,4'-biphenyldicarboxylic acid.

(2) A method to prepare by deacetic acid polycondensation of an aromatic dihydroxy compound or aromatic hydroxycarboxylic acid with an aromatic dicarboxylic acid such as terephthalic acid or 4,4'-biphenyldicarboxylic acid and acetic anhydride.

(3) A method to prepare by dephenol polycondensation of a diphenyl ester of an aromatic dihydroxy compound with an aromatic dicarboxylic acid such as terephthalic acid or 4,4'-biphenyldicarboxylic acid and a phenyl ester of aromatic hydroxycarboxylic acid.

(4) A method to prepare by phenylesterification of carboxyl groups by reacting an aromatic hydroxycarboxylic acid and an aromatic dicarboxylic acid such as terephthalic acid or 4,4'-biphenyldicarboxylic acid with a necessary quantity of diphenyl carbonate, and after that by carrying out dephenol polycondensation by adding an aromatic dihydroxy compound.

For example, p-hydroxybenzoic acid (HBA), 4,4'-biphenol (BP), terephthalic acid (TPA), 4,4'-biphenyldicarboxylic acid (BP-DC) and hydroquinone (HQ) are fed into a reaction vessel, and by adding acetic anhydride, acetylation is carried out under the refluxing of acetic anhydride. After that, deacetic acid polycondensation is carried out by raising the temperature to a range of 250° to 350° C. while distilling off acetic acid, thereby obtaining polyester. The time length of polymerization can be selected from the range of 1 hour to several tens hours.

Typical catalysts used in the polycondensation are exemplified by stannous acetate, tetrabutyl titanate, lead acetate, sodium acetate, potassium acetate, antimony trioxide, and metallic catalysts. They are effective especially in the dephenol polycondensation.

In the above methods of melt polymerization, it is possible to employ the melt polymerization together with solid phase polymerization. In other words, the degree of polymerization of the polymer obtained by polycondensation through the melt polymerization can be raised by the solid phase polymerization.

Any know method can be employed as the above solid phase polymerization. For example, it can be done by a method such that a polyester which is obtained by melt polymerization is heated in a temperature range of 250° to 350° C. for 1 to 10 hours in an atmosphere of nitrogen.

The polymerization vessel is not especially limited. Desirable ones are stirring apparatus generally used for high viscosity reaction such as stirring vessel-type polymerization devices equipped with stirrers, for example, anchor-type stirrer, multi-stage stirrer, helical ribbon stirrer, helical screw stirrer and their modifications. Furthermore, Warner mixer, Banbury mixer, pony mixer, Muller mixer and roll mill, and continuous type apparatus of Ko-kneader, pug mill, and gear compounder.

The polyester of the present invention can be copolymerized with aromatic dicarboxylic acids such as 2,6-dicarboxynaphthalene, 2,5-dicarboxynaphthalene, 3,4'-biphenyldicarboxylic acid, and 3,3'-biphenyldicarboxylic acid; aromatic diols such as resorcinol, catechol, 2,6-dihydroxynaphthalene, and 2,5-dihydroxynaphthalene; and aromatic hydroxycarboxylic acids such as m-hydroxybenzoic acid, 6-hydroxy-2-naphthoic acid; p-aminophenol and p-aminobenzoic acid as well as the monomers containing the foregoing constituent units. The use quantities of these materials must be within the extent that the effect of the present invention is not impaired.

In the conventional art, the melting point of polyester is obtained by measuring the peak of heat absorption in DSC (differential scanning calorimeter). More particularly, the thermal history of polyester resin to be measured is removed by any appropriate measure. After that, the temperature of the polyester resin is raised by DSC and during the rise of temperature, the heat absorption is measured. The temperature corresponding to the peak of heat absorption is regarded as the melting point of the tested resin. The melting point obtained by this method is employed as a criterion for determining the molding temperature of a resin. For example, if this melting point is high, it is guessed that a high molding temperature is necessary. When molding is carried out at a temperature below this molding temperature, several troubles are caused to occur, for example, molding operation is unstable and sizes of molded articles are not accurate. In a worst case, the molding operation is impossible.

In the case of polyester having optical melt anisotropy, the molding temperature is generally close to the thermal decomposition temperature of the polyester (because the thermal decomposition temperature depends upon the interatomic bond energy, the value of the thermal decomposition temperature is not liable to vary with the kinds of polyesters). Accordingly, in order to avoid the thermal decomposition in an extreme case, the material having a low molding temperature has been demanded.

In the case of polyesters having low optical melt anisotropy, it was noticed that melting points measured by DSC are not suitable as measures for determining molding temperatures.

It was found out that the apparent viscosity of polyester having optical melt anisotropy rapidly lowers with the rise of temperature by heating in a temperature range below a specific temperature. At temperatures higher than the above specific temperature, however, the change in apparent viscosity with the change of temperature is very small. In addition, the specific temperature showing the above phenomenon is generally considerably higher than the melting point which is obtained by the foregoing DSC measurement. Thus, the specific temperature at which the change of apparent viscosity with the change of temperature becomes small is hereinafter referred to as "stabilization starting temperature of apparent viscosity".

Because the change in viscosity is small at temperatures above the stabilization starting temperature of apparent viscosity, it is appropriate to perform the molding operation in such a temperature range. In the case of polyester having optical melt anisotropy, the "stabilization starting temperature of apparent viscosity" can be adopted as a measure for determining molding temperature. In other words, if this temperature of a polyester is low, it is possible to perform molding at a low temperature.

In the case of the polyester of the present invention, the melting point obtained by DSC measurement is high, heat distortion temperature and anti-blistering temperature (the temperature at which blistering occurs) are high. Nevertheless, the polyester of the present invention is characterized in that its molding temperature is lower than the molding temperature of conventionally known polyesters.

The aromatic polyester of the present invention can be prepared by appropriately combining the foregoing composition of the foregoing components and known polymerization conditions, so that the polymerization may be carried to obtain a product having the above-mentioned physical properties.

The polyester of the present invention prepared as the above, can be incorporated with several fillers such as fibrous, granular or flaky organic and inorganic materials in order to improve mainly its mechanical strength.

The fibrous fillers are exemplified by inorganic fibrous materials such as glass fiber, asbestos fiber, silica fiber, silica-alumina fiber and potassium titanate fiber, and metallic fibers such as aluminum fiber, titanium fiber and copper fiber. Among them, a typical one is the glass fiber.

Meanwhile, the granular fillers are exemplified by carbon black, graphite, silica, quartz powder, glass beads, milled glass fiber, glass balloon, glass powder, silicates such as calcium silicate, aluminum silicate, talc, clay, diatomaceous earth and wollastonite, metal oxides such as iron oxide, titanium oxide, zinc oxide, antimony trioxide and alumina, and several kinds of metal powders.

The flaky fillers are exemplified by mica, glass flakes and several kinds of metal foils.

The organic fillers are exemplified by heat resistant high-strength synthetic fibers such as aromatic polyester, aromatic polyamide and polyimide fibers. If necessary in the use of these fibers, it is desirable to use together a converging agent or a surface treating agent.

Especially desirable inorganic fillers are exemplified by talc, glass fiber, glass beads, and silica-alumina fiber.

The desirable talc is the one which is about 6% in weight loss by heating at 950° C. and contains less than 1% of iron oxide ($Fe_2O_3$).

The glass fiber is commonly used as a reinforcing agent for resins. They are exemplified by short fibers called as milled glass fiber of 5–15 μm in diameter and 50–250 μm in length and long fibers called as chopped glass fiber of 2–5 mm in length.

Silica-alumina fibers of various compositions are commercially available as alumina fiber or silica fiber mainly containing silica and alumina. They are commonly called as ceramic fibers. A typical silica-alumina fiber is prepared by electrically fusing about the same quantities of highly pure silica and alumina and blowing its fine streams of into the form of fibers with high pressure air. The average fiber length is generally 20–200 μm.

The glass beads may be used without any treatment. However, in order to improve the affinity to resins, they can be surface-treated with aminosilane or epoxysilane coupling agent.

Besides the above additives, proper quantities of one or more kinds of various known additives such as anti-oxidizing agent, thermal stabilizer, bulking filler, reinforcing agent, pigment, and flame retardant can be added.

The use quantity of an inorganic filler relative to the whole composition is 95% by weight or less, preferably less than 80% by weight. If more than 95 wt. % of an inorganic filler is added, it is not desirable because mechanical strength is lowered.

Furthermore, other kinds of thermoplastic resins can be added to the polyester of the present invention as far as they do not impair the object of the present invention.

Making the most of the excellent characteristics of the wholly aromatic polyester of the present invention, it can be used for producing several goods such as fibrous materials, films, three-dimensional molded articles, containers and hoses through known melt molding methods such as extrusion molding, injection molding, compression molding, and blow molding.

The molded articles of this kind are exemplified in the following passage:

Electrical machine parts: hair drier parts (housing, etc.), cloth washer parts (bearing, valve, stop cock, rotor, etc.), video recorder parts (brake ring, etc.), dishwashing machine parts, coffee server parts (housing, etc.), tape recorder parts (bearing, etc.), cloth drier parts (pin, etc.), magnetic induction range parts (sensor casing, etc.), electric motor parts (commutator, brush holder, coreless motor parts, etc.), lamp holder (projector socket, halogen lamp socket, etc.), potentiometer (coil former, etc.), soldering iron parts, casserole stand, record-player parts (tone arm bearing, etc.); electronic machine parts: relay parts (housing, arc insulator, etc.), print-circuit board, switch (housing, etc.), connector, bobbin, electronic clock parts (housing, stator for trimmer capacitor, insulating material, etc.), level switch parts, electronic replacement parts (microwave attenuator parts, bobbin, etc.), parts of IC manufacturing apparatus (IC socket, wafer basket, sleeve, etc.), ultrasonic inspection meter (sensor, etc.), electronic tube parts (insulator ring, etc.), electronic parts holder, internal pressure meter for internal combustion engine cylinder (ring element insulator, etc.), electric cell parts (catalyst holder, etc.), electrical resistor, hearing aid parts, surface thermometer parts (coupling parts, etc.), electric fuse parts (housing, etc.); automobile parts: EGR valve (valve body, valve cover, valve, etc.), piston ring, apex sealing, plug insulator, shock absorber parts (ring, bearing, etc.), bulldozer parts (piston ring, bearing, etc.), distributor parts (cam, housing, etc.), ignition switch parts (housing, etc.), brake parts (binder for brake material, brake shoe, bleeder, etc.), exhaust gas pipe parts (sleeve, etc.), exhaust gas temperature sensor (housing, etc.), wire cable, lamp parts (head lamp reflector, etc.), car cooler; sliding parts and machine parts: photocopying machine parts (separation pawl, bearing, hot roll coating device, etc.), computer parts (wear proof ring, etc.), line printer parts (guide, back-up bar ring, etc.), compressor parts (piston ring, brake, etc.), sliding parts for soy sauce manufacturing apparatus, parts of drier for paper making, spinning machine parts (spindle, pulley, clinper guide, etc.), motion picture projector parts, vending machine parts (bearing, etc.), jig for glass producing machine, jig for cathode-ray tube manufacturing machine, jig for electric wire manufacturing machine, jig for can manufacturing machine, jig for bottle manufacturing machine (feeding pawl, etc.), stern tube bearing, oilless bearing parts (oilless bearing, three-layer bearing, etc.), submerged bearing, heat resistant bearing for sterile works, roller bearing (ball-race, etc.), packing, conveyor belt, mechanical seal, pulley, air pump (rotor, etc.), linear compressor (piston, etc.), locking device parts, reflowing solder parts, guide pin for welding, change-over valve for liquid chromatography, parts for petroleum winning pump, insulating material for pipe flange, parts for room heating pipe (insulating washer, etc.), extruder parts (dies, etc.), camera body, gas calorimeter parts (housing, etc.), sewing machine parts (cam, etc.), cigarette lighter parts (housing, etc.), dial gauge parts, insulating material for stator of refrigerator, parts for air conditioning apparatus (muffler, etc.), robot parts, bearing for oven, gasoline filter, parts for synchrotron, TLD parts (cap, etc.), abradable seal, binder for sharpening stone, simple metal mold, heat resistant fiber-reinforced table ware for airplane foods, and ski.

The molded articles which are made according to the present invention can be used as tray-type or box-type oven ware such as cooking wear for use in an oven or a range, particularly the cooking ware used in an electronic oven which is heated by microwave irradiation, more preferably in an electronic oven-range which is heated by microwave and oven heater system.

Besides them, the molded articles are used for making machine parts of electronic ovens or electronic oven-ranges, which parts are exemplified by three-legged stay, bracket, turn table, rotating hub, protecting cover of top plate, and plug cover which are exposed to high temperature atmosphere. Because the electronic oven-range are exposed not only to the heat of high frequency but also to the heat of oven heater, very high thermal characteristics are required. The molded articles according to the present invention can have satisfactory characteristics in the uses like this.

The fluorocarbon resin layer applied to the above-mentioned molded articles of the wholly aromatic polyester can be formed by coating of fluorocarbon resin or superposing a fluorocarbon resin film. The fluorocarbon resin used for this coating or superposing is not limited so far as the resin is heat resistant.

Preferable fluorocarbon resin is polyfluoroethylene which is represented by the following general formula:

wherein each of $X_1$ to $X_3$ is an atom selected from fluorine, hydrogen and chlorine.

The polyfluoroethylene represented by the above formula are exemplified by polytetrafluoroethylene, tetrafluoroethylene-perfluoroalkylvinyl ether copolymer, tetrafluoroethylene-hexafluoropropylene copolymer, tetrafluoroethylene-hexafluoropropylene copolymer-perfluoroalkylvinyl ether copolymer, tetrafluoroethylene-ethylene copolymer, polychlorotrifluoroethylene, chlorotrifluoroethylene-ethylene copolymer, polyvinylidene fluoride, and polyvinyl fluoride. Among them, polytetrafluoroethylene is desirable because the heat resistance as a coating is good.

For example, an enamel which is prepared by dispersing by concentrating an emulsion of the polymer of fluorocarbon resin together with a surface active agent, or a composition of fluorocarbon resin and a heat resistant film forming resin can be used as a material for coating. The heat resistant film forming resins are exemplified by polyamide imide, polyimide, precursors of them, polysulfone, polyphenylene sulfide, polyether imide and silicone resin.

Particular polyfluoroethylene coating agent used for baking finish layer are exemplified by enamel type materials of Polyflon TPFE Enamel (made by Daikin Kogyo Co., Ltd.) and Teflon PTFE Enamel (made by Mitsui Du Pont Fluorochemical Co., Ltd.) When a coating of fluorocarbon resin is formed, a primer as an undercoating can be used. It is also possible to roughen previously the surface by sand blasting.

As the method for applying coating on fluorocarbon resin, any of commonly employed methods can be used. In an example, enamel or dispersion of polyfluoroethylene is applied to the surface of the resin by spraying or brushing, and it is then baked by heated treatment at a temperature above the melting point of the polyfluoroethylene to form a coating. The molded article of the present invention is characterized in that good surface finish can be obtained even when the polytetrafluoroethylene having a high melting point is used.

The molded article prepared from the wholly aromatic polyester of the present invention has optical anisotropy and good fluidity which are derived from its molecular arrangement, and its mechanical properties and heat resistance are excellent.

The strength of the thus prepared molded article can be improved by heat treatment and, in many cases, its elastic modulus can also be improved. This heat treatment is done by heating at a temperature below the melting point of the polymer under inert atmosphere (e.g. in nitrogen, argon, helium or steam), oxygen-containing atmosphere (e.g. in the air) or under a reduced pressure.

BEST MODE FOR CARRYING OUT THE INVENTION

In the following, the present invention will be described in more detail with reference to examples.

<Method for Measurement>

The physical properties shown in examples of the present invention were determined through the following methods. The temperatures determined by the following method were used as molding temperatures. (Melting Point): DSC Apparatus (SSC-5020, made by Seiko Denshi Kogyo Co., Ltd.)

In the first place, the thermal history of a sample is eliminated by raising temperature at a rate of 20° C./min under nitrogen atmosphere until the peak of heat absorption is observed. After that, the sample is cooled to the room temperature at a rate of 10° C./min. The sample is then heated again at a rate of 20° C./min and in this procedure, the point at which the peak of heat absorption is observed, is regarded as melting point (Tm, ° C.).

(Stabilization Starting Temperature of Apparent Viscosity): The temperature dependency of apparent viscosity at a shear rate of 100 $sec^{-1}$ is measured by using a capillary of L/D=40/1 (mm/mm) and 90° in inflow angle of capillary rheometer (model 2010, made by Intesco Co., Ltd.), from which the stabilization starting temperature of apparent viscosity (Tv, ° C.) is obtained. That is, the sample is heated at a constant rate of 4° C./min from the temperature lower by 50° C. than the melting point (Tm) which is previously measured by the above method, thereby measuring the temperature dependency of apparent viscosity (gradient relative to temperature) and obtaining the temperature at which the temperature dependency of apparent viscosity is abruptly lowered. In the obtained curve of apparent viscosity-temperature, the curve of viscosity change is relatively close to a straight line in the regions sufficiently higher or sufficiently lower than the point at which the change in apparent viscosity becomes abruptly small. Therefore, tangent lines are drawn at the points before and behind the temperature at which the temperature dependency of apparent viscosity is abruptly lowered. The temperature corresponding to the intersecting point of these tangent lines is read out, which is regarded as the stabilization starting temperature of apparent viscosity (Tv).

(Anti-Blistering Temperature): Molded test pieces were kept in a high temperature oven for 2 hours in nitrogen atmosphere of predetermined temperature. After that, the test pieces were taken out and the occurrence of blistering in the surface is observed. The oven temperatures were raised at intervals of 5° C. and the temperature at which blistering occurred was named as anti-blistering temperature.

(Heat Distortion Temperature, HDT): Molded test samples were used according to ASTM D 648 (load: 18.5 $kg/cm^2$).

(Tensile Strength Test): Tested according to ASTM D 638.

(Izod Impact Strength Test (without notch): A test piece for heat distortion temperature was divided into two equal parts in a longitudinal direction. The thus obtained test pieces were tested according to ASTM D 256.

(Electronic Oven-Range Resistance): An empty vessel or three-legged stay was placed on the turn table of an electronic oven-range (RE-HL10, made by Sharp Corporation). After it was heated by the range heater for 10 minutes, oven heating was carried out for 30 minutes at a preset temperature of 300° C. After that, the sample was taken out and external appearance was observed. Furthermore, another sample was subjected to range heating for 10 minutes, which was followed by grille heating for 30 minutes. After that it was taken out and the external appearance was observed.

The polyesters prepared in the following examples had optical anisotropy when they were melted by heating.

In the preparation of test pieces from the polyester obtained in the following examples and comparative examples, an injection molding machine (Model SG-25, made by Sumitomo Heavy Industries, Ltd.) was used. The injection molding was carried out in usual manner with setting the temperature of cylinder to the above "stabilization starting temperature of apparent viscosity". All molding operation was carried out stably without any trouble and could obtain test pieces of predetermined sizes. Therefore, it was confirmed that the above-mentioned "stabilization starting temperature of apparent viscosity" can be employed as a measure for the molding temperature.

<Example 1>

A polymerization vessel having an anchor-type stirrer was used. To the polymerization vessel having a small clearance between the vessel wall and stirring blade, were fed 1,105.44 g (8.00 moles) of p-hydroxybenzoic acid (HBA), 659.93 g (3.544 moles) of 4,4'-biphenol (BP), 631.29 g (3.80 moles) of terephthalic acid (TPA), 48.45 g (0.20 mole) of 4,4'-biphenyldicarbxylic acid (BP-DC), and 52.85 g (0.48 mole) of hydroquinone as shown in Table 1. After vacuum drying, 1,720.26 g of acetic anhydride was added and acetylation was carried out at 150° C. for 3 hours under the refluxing of acetic anhydride. After that, the temperature was raised to 280° C. at a rate of 1° C./min, during which acetic acid was distilled off and the contents were maintained for 1 hour.

In the next step, deacetic acid polymerization was carried out by raising temperature to 300° C. at a rate of 1° C./min, maintaining for 1 hour, further raising temperature to 330° C. at the same rate, and maintaining for 20 minutes. After that, the obtained polymer was taken out from an outlet port.

The polymer was pulverized and was subjected to heat treatment at 280° C. for 2 hours, 300° C. for 2 hours and further 320° C. for 5 hours in a nitrogen atmosphere.

The heat treated polymer and milled glass fiber in a weight ratio of 60/40 were mixed together and test pieces were made from the mixture by injection molding. The operation of injection molding was done stably.

The physical properties and molding properties of the thus obtained test pieces are shown in the following Table 2.

<Examples 2–5>

Using the same apparatus as those used in Example 1, p-hydroxybenzoic acid (HBA), 4,4'-biphenol (BP), terephthalic acid (TPA), 4,4'-biphenyldicarbxylic acid (BP-DC), and hydroquinone were fed. The quantities of the used materials are shown in Table 1. In the like manner as in Example 1, polymerization, heat treatment, mixing and preparation of test pieces were carried out, wherein the molding operation were carried out stably.

The physical properties and molding properties of the thus obtained test pieces are shown in the following Table 2.

<Examples 6, 7>

Using the same apparatus as those used in Example 1, p-hydroxybenzoic acid (HBA), 4,4'-biphenol (BP), terephthalic acid (TPA), isophthalic acid (IPA), and 4,4'-biphenyldicarbxylic acid (BP-DC) were fed. After vacuum drying, 1,720.26 g of acetic anhydride was added and acetylation was carried out under the refluxing of acetic anhydride at 150° C. for 3 hours. After that, the temperature was raised to 280° C. at a rate of 1° C./min with distilling off the acetic acid and the contents were maintained for 1 hour.

In the next step, deacetic acid polymerization was carried out by raising temperature to 300° C. at a rate of 1° C./min, maintaining for 1 hour, further raising temperature to 330° C. at the same rate, and maintaining for 1 hour. After that, the obtained polymer was taken out from an outlet port.

The polymer was pulverized and was subjected to heat treatment at 250° C. for 1 hour, 280° C. for 2 hours, 300° C. for 2 hours and further 320° C. for 5 hours in a nitrogen atmosphere. The heat treated polymer and milled glass fiber in a weight ratio of 60/40 were mixed together and test pieces were made from the mixture by injection molding. The operation of injection molding was done stably.

The physical properties and molding properties of the thus obtained test pieces are shown in the following Table 2.

<Comparative Examples 1–7>

Using the same apparatus as those used in Example 1, p-hydroxybenzoic acid (HBA), 4,4'-biphenol (BP), terephthalic acid (TPA), isophthalic acid (IPA), and phenylhydroquinone (Ph-HQ) were fed. The quantities of the used materials are shown in Table 1. In the like manner as in Example 1, polymerization, heat treatment, mixing and preparation of test pieces were carried out.

The physical properties and molding properties of the thus obtained test pieces are shown in the following Table 2.

<Comparative Examples 8, 9>

Using the same apparatus as those used in Example 1, p-hydroxybenzoic acid (HBA), 4,4'-biphenol (BP), terephthalic acid (TPA), and isophthalic acid (IPA) were fed. The quantities of the used materials are shown in Table 1. In the like manner as in Example 1, polymerization, heat treatment, mixing and preparation of test pieces were carried out.

The physical properties and molding properties of the thus obtained test pieces are shown in the following Table 2.

<Comparative Example 10>

In this comparative example, because the ratio of BP-DC was as large as 10 mol % as shown in Table 1, the polymerization time was prolonged, so that the coloring of obtained polymer was intense. Accordingly, the test on physical properties was not performed.

TABLE 1

| Example | Monomer | | | | | | |
|---|---|---|---|---|---|---|---|
| | HBA k (mol %) | BP l (mol %) | HQ m (mol %) | TPA n (mol %) | IPA o (mol %) | BP-DC p (mol %) | Ph-HQ (mol %) |
| Example 1 | 50 | 22 | 3 | 23.75 | — | 1.25 | — |
| Example 2 | 50 | 23 | 2 | 23.5 | — | 1.5 | — |
| Example 3 | 50 | 22 | 3 | 22 | — | 3 | — |
| Example 4 | 50 | 23.5 | 1.5 | 23.5 | — | 1.5 | — |
| Example 5 | 50 | 25 | — | 22 | — | 3 | — |
| Comp. Ex. 1 | 50 | 22.5 | — | 25 | — | — | 2.5 |
| Comp. Ex. 2 | 50 | 22 | — | 25 | — | — | 3 |
| Comp. Ex. 3 | 50 | 21.5 | — | 25 | — | — | 3.5 |
| Comp. Ex. 4 | 50 | 25 | — | 22 | 3 | — | — |
| Comp. Ex. 5 | 50 | 25 | — | 21 | 4 | — | — |
| Comp. Ex. 6 | 50 | 25 | — | 20 | 5 | — | — |
| Comp. Ex. 7 | 50 | 25 | — | 25 | — | — | — |
| Example 6 | 60 | 20 | — | 17 | — | 3 | — |
| Example 7 | 60 | 20 | — | 12 | 5 | 3 | — |
| Comp. Ex. 8 | 60 | 20 | — | 20 | — | — | — |
| Comp. Ex. 9 | 60 | 20 | — | 15 | 5 | — | — |
| Comp. Ex. 10 | 50 | 25 | — | 15 | — | 10 | — |

TABLE 2

| Example | Melt. Pt. (°C.) | Mold. Temp. (°C.) | S.S.T. Ap. Vis. (°C.) | Heat Dist. Temp. (°C.) | Ant-Bl. Temp. (°C.) | Tv-Tm (°C.) |
| --- | --- | --- | --- | --- | --- | --- |
| Example 1 | 395 | 398 | 398 | 341 | 340 | 3 |
| Example 2 | 405 | 403 | 403 | 333 | 335 | -2 |
| Example 3 | 389 | 384 | 384 | 328 | 325 | -5 |
| Example 4 | 408 | 407 | 407 | 341 | 325 | -1 |
| Example 5 | 407 | 400 | 400 | 325 | 320 | -7 |
| Comp. Ex. 1 | 395 | 412 | 412 | 304 | 315 | 17 |
| Comp. Ex. 2 | 387 | 410 | 410 | 298 | 300 | 23 |
| Comp. Ex. 3 | 383 | 407 | 407 | 292 | 300 | 24 |
| Comp. Ex. 4 | 403 | 420 | 420 | 335 | 325 | 17 |
| Comp. Ex. 5 | 392 | 413 | 413 | 323 | 315 | 21 |
| Comp. Ex. 6 | 385 | 405 | 405 | 309 | 305 | 20 |
| Comp. Ex. 7 | 430 | 441 | 441 | 360 | 280 | 11 |
| Example 6 | 380 | 378 | 378 | 341 | 320 | -2 |
| Example 7 | 348 | 350 | 350 | 362 | 310 | 2 |
| Comp. Ex. 8 | 386 | 426 | 426 | 341 | 290 | 40 |
| Comp. Ex. 9 | 365 | 390 | 390 | 300 | 370 | 25 |

Notes:
Melt. Pt: Melting point
Mold. Temp.: Molding temperature
S.S.T. Ap. Vis: Stabilization starting temperature of apparent viscosity
Heat Dist. Temp.: Thermal deformation temperature
Ant-Bl. Temp.: Anti-blistering temperature The correlationship between heat distortion temperatures and stabilization starting temperatures of apparent viscosities (i.e., molding temperatures) of the compositions in Examples 1 to 5 and Comparative Examples 1 to 7 is shown in FIG. 1.

Figure 1:
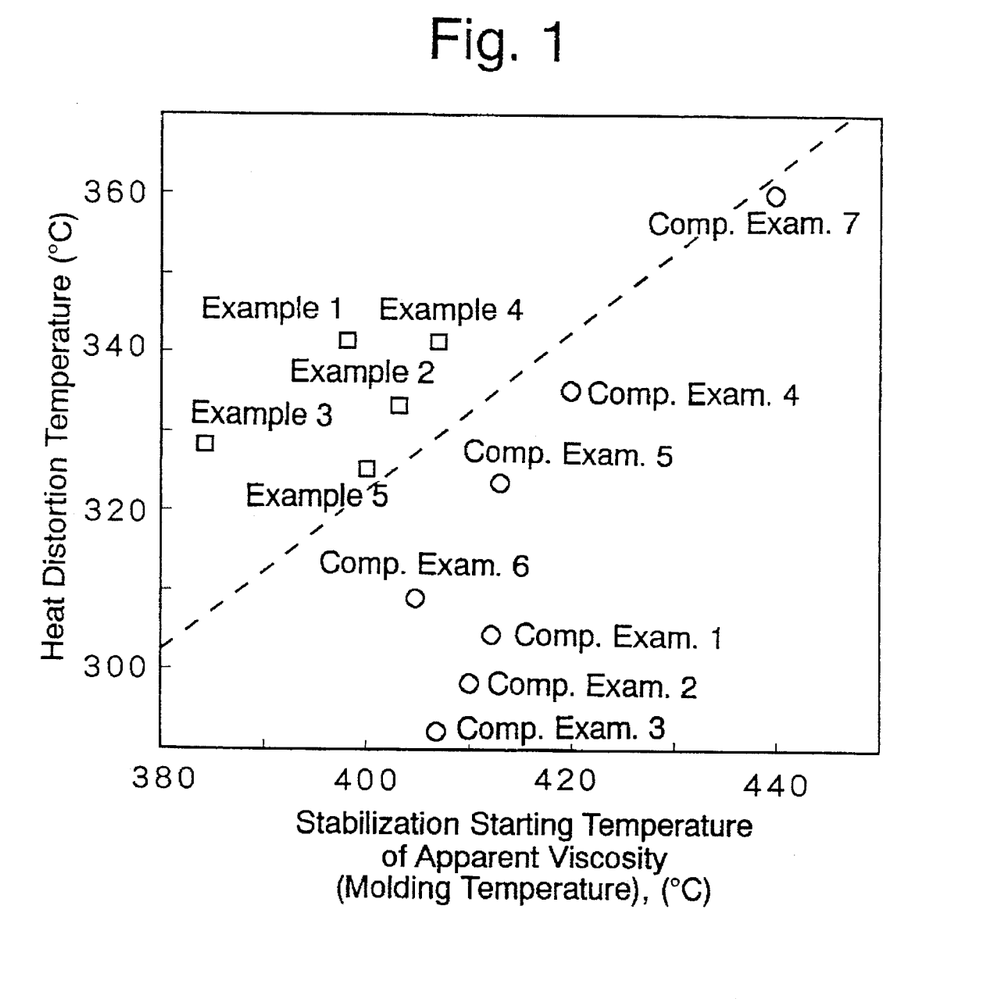
FIG. 1 is a graph showing the relationship between stabilization starting temperatures of apparent viscosities (molding temperatures) and heat distortion temperatures.

In FIG. 1, all the data on the compositions in Examples 1 to 5 exist above the straight line of equation:

Heat distortion temp.(° C.)=Molding temp.(° C.)−78° C.
The heat distortion temperatures relative to the molding temperatures of them are higher than those of compositions in Comparative Examples 1 to 7. From this fact, it is understood that the wholly aromatic polyesters according to the present invention is characterized in that, even when the molding temperature is low, the heat distortion temperature is high.

Figure 2:
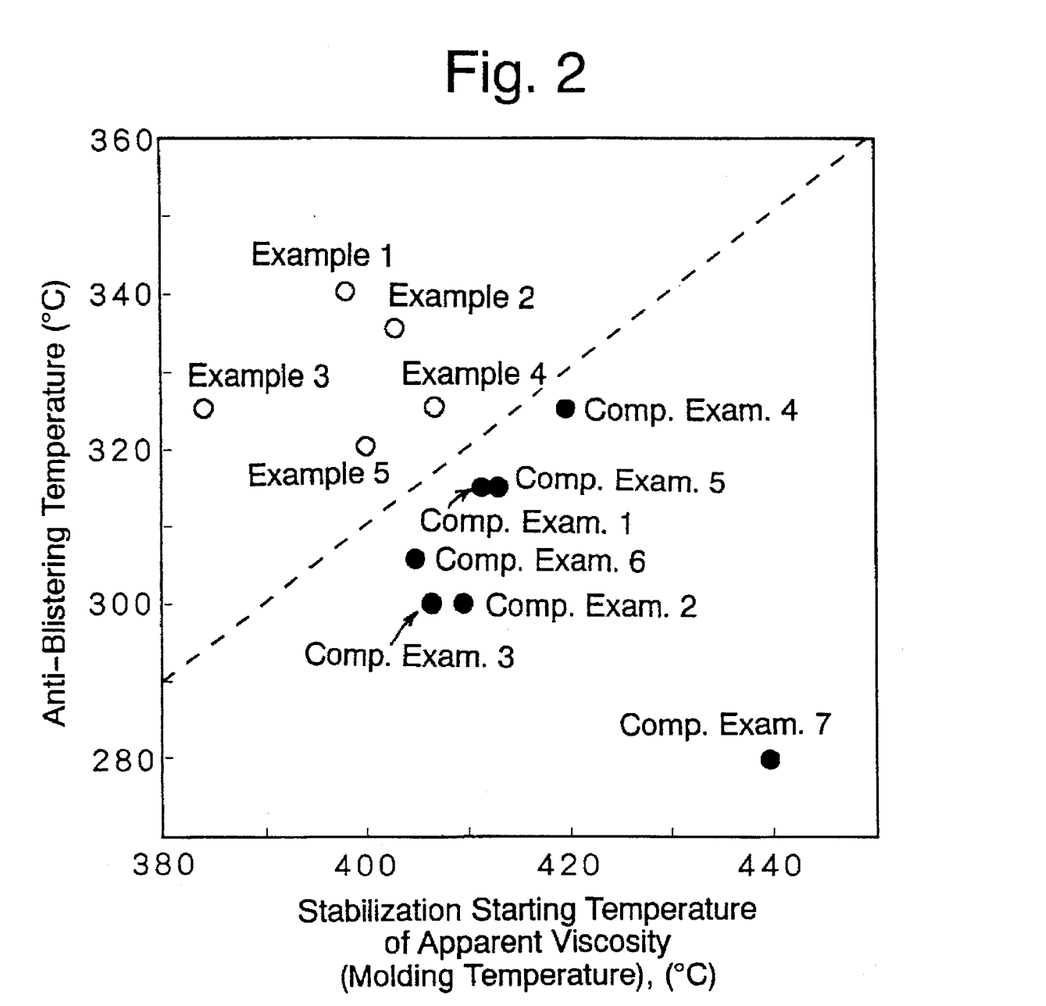
FIG. 2 is a graph showing the relationship between stabilization starting temperatures of apparent viscosities (molding temperatures) and anti-blistering temperatures.

The correlationship between the anti-blistering temperatures and the stabilization starting temperatures of apparent viscosities of the compositions in Examples 1 to 5 and Comparative Examples 1 to 7 is shown in FIG. 2.

In FIG. 2, all the data on the compositions in Examples 1 to 5 exist above the straight line of equation:

Anti-blistering temp.(° C.)=Molding temp.(° C.)−90° C.
The anti-blistering temperatures relative to the molding temperatures of them are higher than those of the compositions in Comparative Examples 1 to 7. From this fact, it is understood that the wholly aromatic polyesters according to the present invention is characterized in that, even when the molding temperature is low, the anti-blistering temperature is high.

In addition, it is understood from the results in Table 2 that, when the value (Tv−Tm) is less than +10° C., the wholly aromatic polyester has high heat resistance, especially high blistering resistance.

The wholly aromatic polyesters of the monomer compositions in Example 1 to 5 in Table 1 were mixed with milled glass fiber in a weight ratio of 60/40, and the mixtures were melted and kneaded at 400° C. using a twin screw extruder (PCM-30, made by Ikegai Iron Works, Ltd.) to obtain their pellets.

Using these pellets, test pieces for tensile test and heat distortion temperature measurement were made by using an injection molding machine (SG-25, made by Sumitomo Heavy Industries, Ltd.) at a cylinder temperature of 400° C. and a metal mold temperature of 150° C.

Furthermore, using another injection molding machine (SN-302, made by Niigata Engineering Co., Ltd.) at a cylinder temperature of 400° C. and a metal mold temperature of 150° C., oven ware of 200×150×70 mm depth (2.5 mm thick) and tree-legged stays of 30 mm width (2.0 mm thickness) having legs of 150 mm length, were made.

Physical properties and anti-electronic oven-range characteristics are shown in the following Table 3.

In the like manner as in Examples 1 to 5, the wholly aromatic polyesters having the compositions of Comparative Examples 1 to 7 in Table 1 were also molded and tested. The results of them are shown in Table 3.

TABLE 3

| Example | Tensile Strength (kg/cm$^2$) | Izod Impact Strength (kg · cm/ cm$^2$) | Heat Distortion Temperature (°C.) | Anti-electronic Oven-range Characteristics | |
| --- | --- | --- | --- | --- | --- |
| | | | | Oven Heating | Grill Heating |
| Example 1 | 1210 | 55 | 341 | Good | Good |
| Example 2 | 1140 | 52 | 333 | Good | Good |
| Example 3 | 1150 | 42 | 328 | Good | Good |
| Example 4 | 1130 | 42 | 341 | Good | Good |
| Example 5 | 1040 | 43 | 325 | Good | Good |
| Comp. Ex. 1 | 1430 | 46 | 304 | Blister | Blister |
| Comp. Ex. 2 | 1460 | 53 | 298 | Blister | Blister |
| Comp. Ex. 3 | 1530 | 55 | 292 | Blister | Blister |
| Comp. Ex. 4 | 1400 | 56 | 335 | Good | Blister |
| Comp. Ex. 5 | 1550 | 54 | 323 | Good | Blister |
| Comp. Ex. 6 | 1440 | 41 | 309 | Blister | Blister |
| Comp. Ex. 7 | 1230 | 45 | 360 | Blister | Blister |

In view of the results shown in Table 3, the molded articles made of the wholly aromatic polyesters of the present invention were good in the balance between the mechanical strength (tensile strength, Izod impact strength) and the heat resistance (heat distortion temperature) and were excellent in anti-electronic oven-range characteristics. Especially, any blistering was not observed in the grill heating. They had excellent characteristics as the parts of electronic oven-range and as oven ware.

On the other hand, in the molded articles in Comparative Examples 4 to 7, even though the balance between the mechanical strength and the heat resistance was good, they were not good in the anti-electronic oven-range characteristics. The molded articles in Comparative Examples 1 to 3 were not good in the heat distortion temperatures and the anti-electronic oven-range characteristics.

Furthermore, the wholly aromatic polyesters of the monomer compositions in Example 1 to 4 in Table 1 were mixed with milled glass fiber in a weight ratio of 60/40, and the mixtures were melted and kneaded at 400° C. using a twin screw extruder (PCM-30, made by Ikegai Iron Works, Ltd.) to obtain their pellets. Using the thus obtained pellets, 20 test pieces for bending test were made by using an injection molding machine (SG-25, made by Sumitomo Heavy Industries, Ltd.) at a cylinder temperature of 400° C. and a metal mold temperature of 150° C. The obtained molded articles were coated with polyflon enamel (fluorocarbon resin of polytetrafluoroethylene, made by Daikin Kogyo Co., Ltd.) and baked at 340° C. The surface conditions of these test pieces were observed.

By observation with naked eyes, when neither blistering nor deformation was observed, the test pieces were regarded as acceptable which were indicated with percentage yields. The results of tests are shown in the following Table 4.

TABLE 4

| Example | Sample with Good Surface Condition out of 20 Test Pieces (Number of Test Pieces) | Yield (%) |
| --- | --- | --- |
| Example 1 | 20 | 100 |
| Example 2 | 20 | 100 |
| Example 3 | 18 | 90 |
| Example 4 | 18 | 90 |
| Comp. Ex. 1 | 0 | 0 |
| Comp. Ex. 2 | 0 | 0 |
| Comp. Ex. 4 | 9 | 45 |
| Comp. Ex. 5 | 6 | 30 |
| Comp. Ex. 7 | 7 | 35 |

It was understood from Table 4 that the molded articles of wholly aromatic polyesters according to the present invention which were coated with fluorocarbon resin had yields of 90% or higher. Meanwhile, in Comparative Examples 4, 5 and 7, the yields were lower than 50% and blistering was caused to occur in all the test pieces in Comparative Examples 1 and 2.

INDUSTRIAL APPLICABILITY

In comparison with known polyesters, the wholly aromatic polyester of the present invention is excellent in moldability and is improved in the heat distortion temperature and blistering resistance.

In other words, even though the molding temperature is relatively low, the heat distortion temperature and anti-blistering temperature are high.

The electronic oven-range interior parts and oven ware made of the wholly aromatic polyester of the present invention has good balance between the mechanical strength and the heat resistance and excellent in anti-oven range characteristics. Therefore, they are suitable as oven ware and interior parts for electronic oven-ranges.

By the present invention, it was made possible to provide articles coated with fluorocarbon resin at a high yield rate, which articles are made of wholly aromatic polyester of the present invention and are excellent in non-stickiness and frictionless property.

In other words, it is possible to obtain molded articles having good surface conditions even when they are treated by baking finish with fluorocarbon resin coating having a high melting point.

We claim:

1. An aromatic polyester possessing optical melt anisotropy consisting essentially of structural units, which are present in a mole % indicated by letters k, l, m, n, o and p, as follows:

k mole % l mole % m mole % n mole % o mole % p mole % said constituents being present such that they satisfy the following relationships:

$20 \leq k \leq 80$;

substantially equals n+o+p;

$0 \leq o \leq 10$;

$1 \leq p \leq 7$; and $0 \leq m \leq (l+m)/2$ said aromatic polyester satisfying the following relationship:

$$Tv-Tm<+10° C.$$

where Tm is the melting point, in °C, as measured by differential scanning calorimetry and Tv is the temperature, in °C., at which the apparent viscosity is abruptly reduced, as measured by capillary rheometry.

2. A polyester resin composition comprising said aromatic polyester of claim 1 and up to 95% by weight, based on the total weight of the composition, of an inorganic filler.

3. A composition in accordance with claim 2 wherein said inorganic filler is selected from the group consisting of talc, glass fiber, glass beads and silica-alumina fiber.

4. An electronic heating device comprising interior parts fabricated of said aromatic polyester of claim 1.

5. An electronic heating device in accordance with claim 4, wherein said interior parts fabricated of said aromatic polyester are selected from the group consisting of a three-legged stay, a bracket, a turntable, a rotating hub, a top plate protective cover and a plug cover.

6. A molded article comprising an aromatic polyester possessing optical melt anisotropy, said polyester consisting essentially of structural units, which are present in mole %'s indicated by letters k, l, m, n, o and p, as follows:

k mole %

| | |
|---|---|
| | l mole % |
| | m mole % |
| | n mole % |
| | o mole % |
| | p mole % | said structural units being present such that they satisfy the following relationships:

$20 \leq k \leq 80$;

l+m substantially equals n+o+p;

$0 \leq o \leq 10$;

$1 \leq p \leq 7$; and $0 \leq m \leq (l+m)/2$ and a fluorocarbon resin coating.

7. A molded article in accordance with claim 6 wherein said fluorocarbon resin is a polyfluoroethylene having the repeating structural formula:

where $X_1$ to $X_3$ are independently fluorine, hydrogen or chlorine.

8. A molded article in accordance with claim 7, wherein said polyfluoroethylene is selected from the group consisting of polytetrafluoroethylene, tetrafluoroethylene-perfluoroalkylvinyl ether copolymer, tetrafluoroethylene-hexafluoropropylene copolymer, tetrafluoroethylene-hexafluoropropylene copolymer-perfluoroalkylvinyl ether copolymer, tetrafluoroethylene-ethylene copolymer, polychlorotrifluoroethylene, chlorotrifluoroethyelene-ethylene copolymer, polyvinylidene fluoride and polyvinyl fluoride.

9. A molded article in accordance with claim 8, wherein said polyfluoroethylene resin is polytetrafluoroethylene.

10. An aromatic polyester in accordance with claim 1 wherein said meaning of p, in mole %, is $1 \leq p < 4$.

11. A molded article in accordance with claim 6 wherein p, in mole %, has the meaning $1 \leq p < 4$.

\* \* \* \* \*

UNITED STATES PATENT AND TRADEMARK OFFICE
CERTIFICATE OF CORRECTION

PATENT NO. : 5,663,276
DATED : September 2, 1997
INVENTOR(S) : Hiroyoshi Yoneta, et al.

It is certified that error appears in the above-identified patent and that said Letters Patent is hereby corrected as shown below:

On the Title Page, Item [56] after "528/193" insert the following:

--FOREIGN PATENT DOCUMENTS

4-20327  Japan--

Column 4, line 34: after "invention" insert --relates--

Column 4, line 46: after "by" insert --a--

Column 18, line 30, Claim 1: before "substantially" insert -- 1+m --

Signed and Sealed this

Twenty-ninth Day of June, 1999

Attest:

Attesting Officer

Q. TODD DICKINSON

Acting Commissioner of Patents and Trademarks